United States Patent
Seal

(10) Patent No.: US 8,696,130 B2
(45) Date of Patent: Apr. 15, 2014

(54) APPARATUS, SYSTEM, AND METHOD FOR VEHICLE MOUNTED DISPLAY DEVICE

(76) Inventor: Trevor Seal, Sandy, UT (US)

(*) Notice: Subject to any disclaimer, the term of this patent is extended or adjusted under 35 U.S.C. 154(b) by 220 days.

(21) Appl. No.: 12/850,443

(22) Filed: Aug. 4, 2010

(65) Prior Publication Data

US 2011/0032484 A1 Feb. 10, 2011

Related U.S. Application Data

(60) Provisional application No. 61/232,305, filed on Aug. 7, 2009.

(51) Int. Cl.
*G03B 21/00* (2006.01)

(52) U.S. Cl.
USPC ............. 353/13; 353/14; 280/186; 280/406.2

(58) Field of Classification Search
USPC ......... 353/12–14; 701/201; 340/438; 40/451; 280/186, 406.2
See application file for complete search history.

(56) References Cited

U.S. PATENT DOCUMENTS

| | | | |
|---|---|---|---|
| 2,023,845 A | 12/1935 | Larose | |
| 3,191,490 A * | 6/1965 | Rabinow | 353/26 R |
| 5,518,159 A * | 5/1996 | DeGuevara | 224/488 |
| 5,845,921 A * | 12/1998 | Stimac | 280/479.3 |
| 6,079,136 A * | 6/2000 | Kozlarek | 40/541 |
| 6,220,737 B1 * | 4/2001 | Baragona | 362/540 |
| 6,489,934 B1 * | 12/2002 | Klausner | 345/1.1 |
| 6,641,041 B2 | 11/2003 | Olds et al. | |
| 6,655,822 B1 * | 12/2003 | Sylvester | 362/485 |
| 6,685,347 B2 | 2/2004 | Grutze | |
| 6,733,134 B2 | 5/2004 | Bleiner | |
| 7,154,383 B2 | 12/2006 | Berquist | |
| 7,175,321 B1 * | 2/2007 | Lopez | 362/496 |
| 7,327,516 B2 | 2/2008 | Wheeler | |
| 7,407,294 B2 | 8/2008 | Choi | |
| 7,470,030 B2 | 12/2008 | Devos et al. | |
| 7,901,083 B2 * | 3/2011 | Destain et al. | 353/39 |
| 2001/0043313 A1 * | 11/2001 | Okura | 353/97 |
| 2003/0024195 A1 | 2/2003 | Koh et al. | |
| 2003/0099104 A1 | 5/2003 | Hou | |
| 2005/0041212 A1 | 2/2005 | Weidow, III | |
| 2006/0143957 A1 | 7/2006 | Salehi | |
| 2006/0191180 A1 | 8/2006 | Williams et al. | |
| 2006/0268233 A1 | 11/2006 | Sato | |
| 2007/0153375 A1 * | 7/2007 | Peterson et al. | 359/443 |
| 2007/0216136 A1 | 9/2007 | Dietz | |
| 2007/0242471 A1 | 10/2007 | Campbell et al. | |
| 2008/0284983 A1 | 11/2008 | Dula | |
| 2008/0305283 A1 | 12/2008 | Denet | |
| 2009/0015798 A1 | 1/2009 | Unsworth | |
| 2009/0284960 A1 * | 11/2009 | Chien | 362/157 |
| 2010/0141902 A1 | 6/2010 | Destain et al. | |
| 2011/0089297 A1 | 4/2011 | Bishop | |

* cited by examiner

*Primary Examiner* — Francis M Legasse, Jr.
*Assistant Examiner* — Jerry Brooks
(74) *Attorney, Agent, or Firm* — Kunzler Law Group

(57) ABSTRACT

An apparatus, system, and method are disclosed for a vehicle mounted display device which can be easily attached to a vehicle and is removable. The projector can conveniently be plugged into the trailer light power source to give the device power to project an image onto a vehicle. The projector may be digital allowing the owner to choose an image from inside the vehicle. A magnetic or adhesive screen may be placed on the vehicle to allow the image to function properly and effectively on dark paint or other finishes that prevent a clean image. The apparatus comprises an adjustable mounting unit, an adjustable arm, and a projector which can all be adjusted to provide an efficient angle to project the image onto the vehicle.

15 Claims, 17 Drawing Sheets

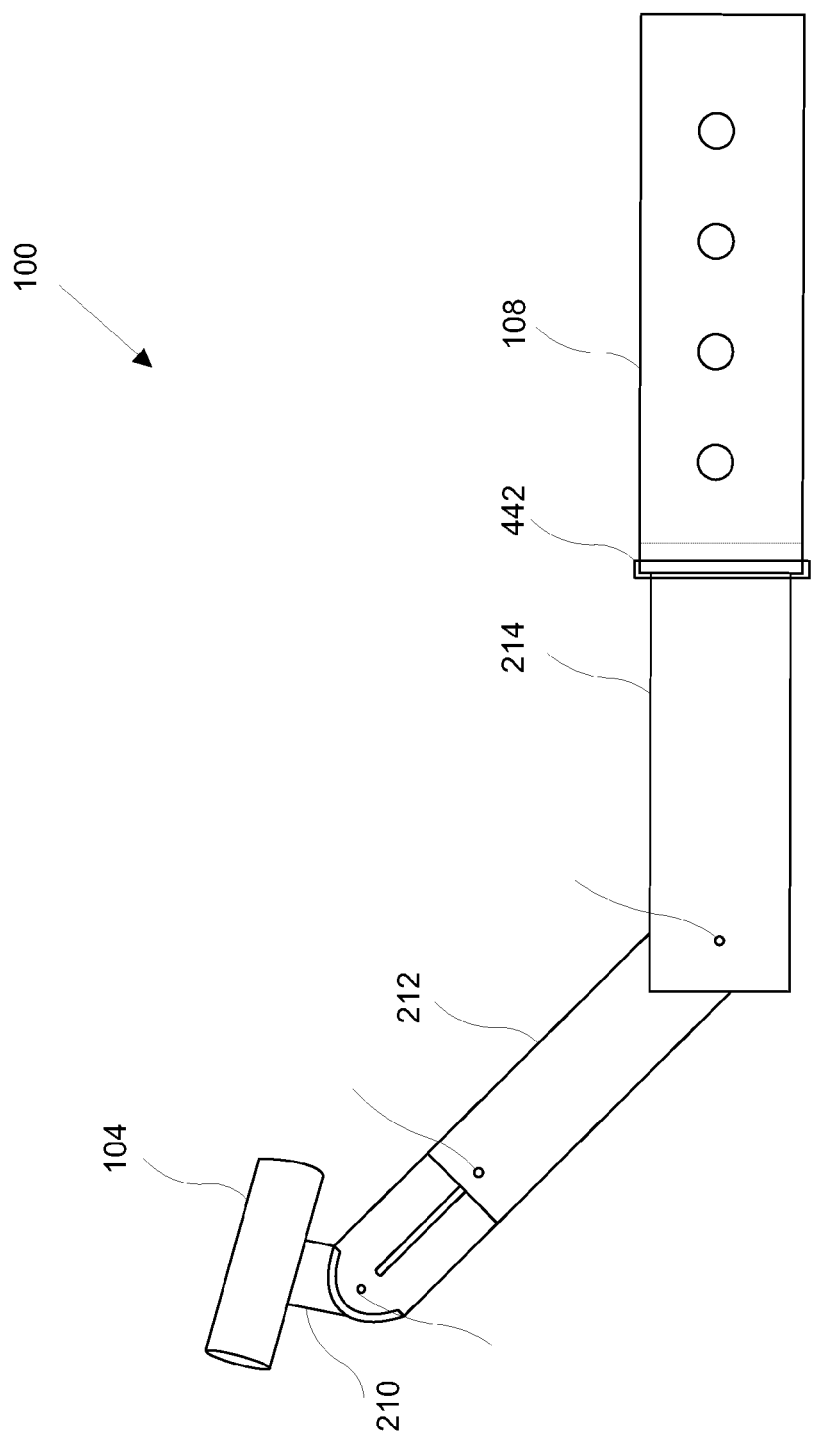

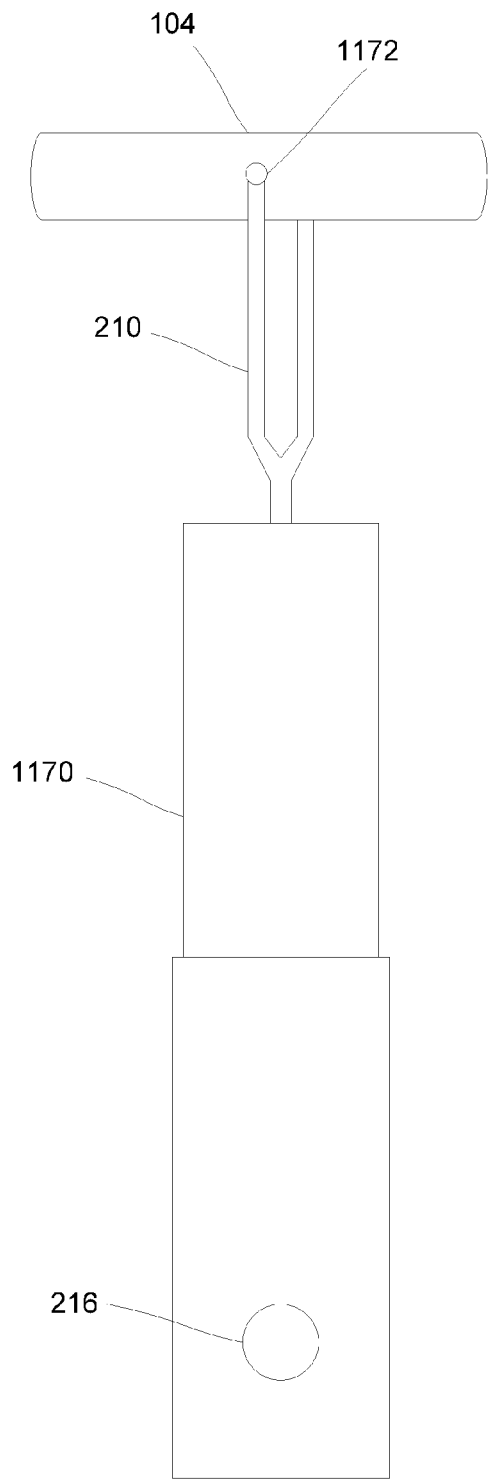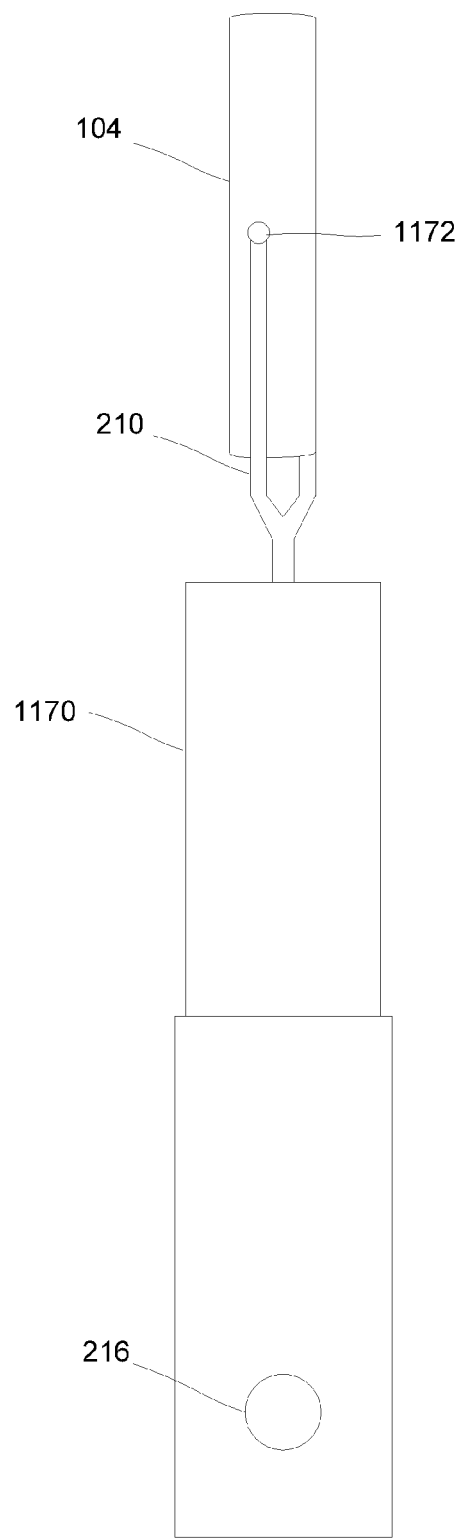
FIG. 11B                                   FIG. 11C

APPARATUS, SYSTEM, AND METHOD FOR VEHICLE MOUNTED DISPLAY DEVICE

CROSS-REFERENCES TO RELATED APPLICATIONS

This application claims priority to U.S. Provisional Application No. 61/232,305 entitled "Apparatus, System, and Method for Vehicle Mounted Display Device" and filed on Aug. 7, 2009 for Trevor Seal, which is incorporated herein by reference for all that it contains.

BACKGROUND

Vehicle manufacturers are constantly in search of mechanisms, methods and styles which customize their vehicles and create unique vehicle designs. Vehicle owners also customize their vehicles to present an image or idea that they find important. Also, companies and small business owners oftentimes look to customize a vehicle as an advertising or promotional tool. Often this is done by painting the vehicle, affixing a large sticker to the vehicle, or purchasing a unique vehicle. These forms of customization and advertising are expensive and time consuming. They are also permanent, or at least require a great deal of work to change. An apparatus, system and method are needed which allow a user to customize a vehicle with ease. The apparatus, system and method would ideally be simple to install and allow the user to easily customize the outward appearance of the vehicle. This invention provides a way for automobile owners to express themselves to the outside world. The apparatus, system and method is small, attaches easily to a vehicle, and is easily removable.

BRIEF SUMMARY

The present invention has been developed in response to the present state of the art, and in particular, in response to the problems and needs in the art that have not yet been fully solved. Accordingly, the present invention has been developed to provide an apparatus, system, and method for displaying images on a vehicle. The invention provides an efficient way to display images on a vehicle because it is quick and instantaneously removable.

The apparatus comprises an adjustable mounting unit which is removably attachable to a vehicle. An adjustable arm that can extend outwards and in the vertical direction is connected to the mounting unit and a projector. The projector is coupled to the adjustable arm and projects an image onto an outer surface of a vehicle.

The apparatus is configured to accept an image cartridge within a projector housing. The apparatus, in one embodiment, comprises a connector arm, an intermediate arm, and a projector arm. The connector arm comprises at least one set of holes and a hitch pin that fits within the set of holes in order to secure the adjustable mounting unit to a typical trailer hitch receiver. The apparatus, in another embodiment, comprises a connector arm, intermediate arm, and projector arm where at least one of the arms extends outward telescopically.

In a further embodiment, the projector is movably coupled with the adjustable mounting unit such that the projector can be positioned in relation to the adjustable mounting unit. The projector, in one embodiment, comprises a focusing mechanism configured to focus an image produced by the projector.

In another embodiment, the image cartridge is swappable by the user by removing the image cartridge from the projector and replacing the image cartridge with a new image cartridge. The projector, in one embodiment, is a digital image projector which can be controlled, changed and updated from inside the vehicle. The projector, in one embodiment, comprises an LED light source. The projector, in a further embodiment, comprises at least one lens.

The apparatus may also comprise a magnetic screen which may be placed on different areas of the vehicle. The magnetic screen allows the image to function properly and effectively on dark paint and other types of vehicle finishes that prevent a clean image.

The apparatus, in one embodiment, folds into itself compactly. The apparatus, in one embodiment, comprises compressed foam rubber to act as a collar configured to further secure the adjustable mounting unit to a trailer hitch receiver of a vehicle.

The apparatus, in one embodiment, is telescopic and retracts completely into the receiver shaft of the vehicle. In another embodiment, the apparatus is battery-powered and attachable to the vehicle with suction cups.

The projector in certain embodiments comprises a rear surface with a dial. There is also a light housing inside the projector. The dial on the rear surface causes the light housing to move in order to focus the projector. The apparatus, in one embodiment, comprises a light sensor which adapts the brightness of the light to function for both day and night. The apparatus, in a further embodiment, comprises connection means to attach to a receiver hitch. The apparatus, in one embodiment, comprises a power connector which is configured to connect with a typical trailer light power source.

The system projects an image onto the exterior surface of a vehicle. The system comprises an adjustable mounting unit which is removable attachable to a vehicle. It also comprises an adjustable arm connecting the mounting unit and projector, where the adjustable arm extends outward from the mounting unit and is adjustable in the vertical direction. A projector is coupled to the adjustable arm, and is attached to the vehicle through the adjustable mounting unit; the projector projects the image onto an outer surface of the vehicle. An image cartridge is disposed within the projector. Further, a focusing mechanism, in one embodiment, is on the rear surface of the projector and focuses the image on the vehicle.

A method is provided for projecting an image onto an outer surface of a vehicle. The method provides an adjustable mounting unit which is removably attachable to a vehicle. It also provides an adjustable arm connecting the mounting unit and projector where the adjustable arm extends outward from the mounting unit and is adjustable in the vertical direction. The method also provides a projector that is coupled to the adjustable arm. The projector is attached to the vehicle through the adjustable mounting unit and projects an image onto an outer surface of the vehicle. The method also provides an image cartridge disposed within the projector. It also provides means for securing the image cartridge within the projector. The method comprises attaching the adjustable mounting unit to a trailer hitch receiver. It also comprises orienting the projector and the adjustable mounting unit such that an image is projected onto the outer surface of the vehicle.

BRIEF DESCRIPTION OF THE DRAWINGS

In order that the advantages of the invention will be readily understood, a more particular description of the invention will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4B is a side view of another embodiment of the invention;

FIG. 11B is a side view of another embodiment of the invention;

FIG. 11C is a side view of the same embodiment as FIG. 11B, shown with the projector spun in preparation to collapse the adjustable mounting unit.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of trailer hitch receivers, materials, vehicle types, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
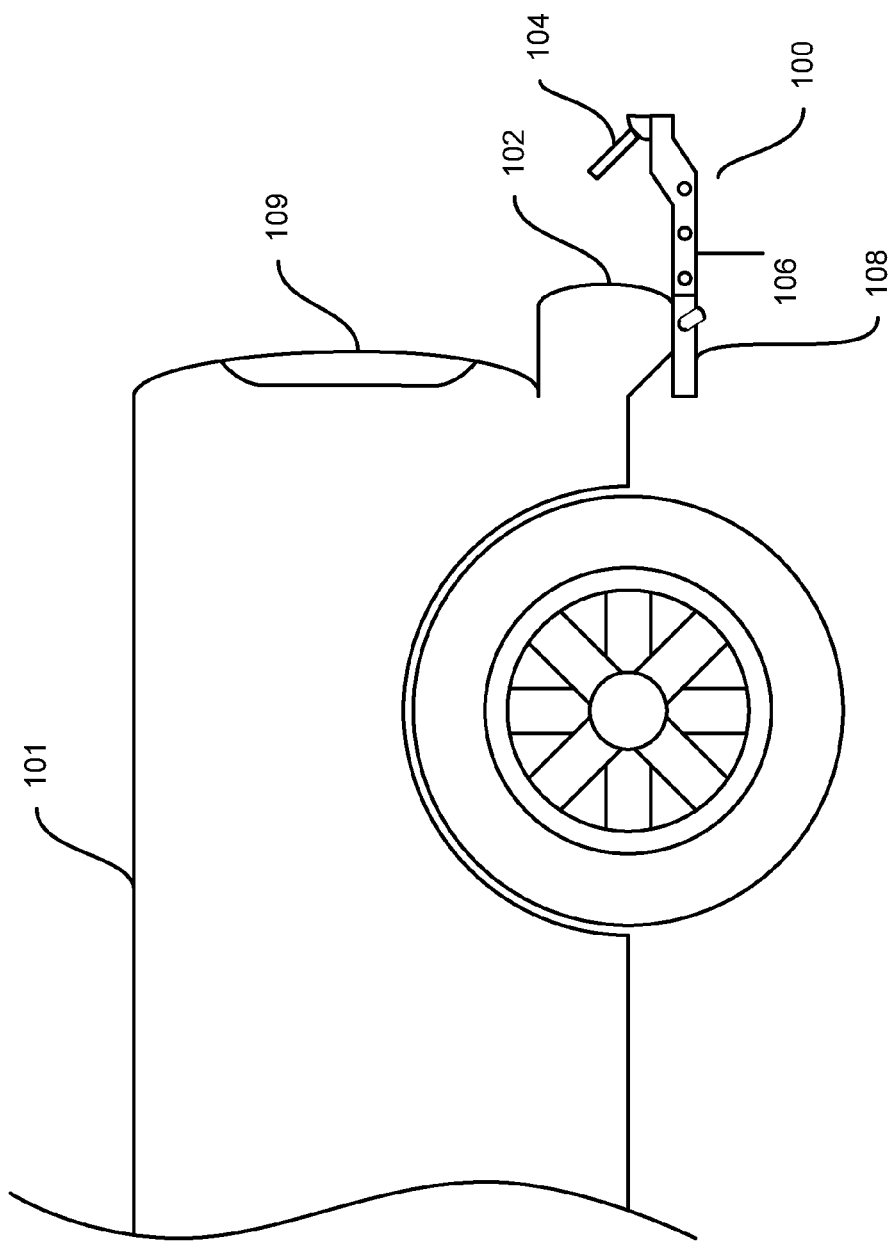
FIG. 1 is a side view of one embodiment of the invention while the invention is attached to a rear portion of a vehicle.

FIG. 1 depicts one embodiment of a vehicle mounted display device 100 used to display images on an exterior surface of a vehicle 101. FIG. 1 shows the vehicle mounted display device 100 while it is attached to a rear portion 102 of a vehicle 101. The vehicle mounted display device 100 contains a projector 104, an image cartridge 230 (not shown) and an adjustable mounting unit 106. In one embodiment, the adjustable mounting unit 106 contains a connector arm 214, an intermediate arm 212 and a projector arm 210. In one embodiment, the projector 104 shines an image onto an external surface of a vehicle 101. The position of the projector 104 can be adjusted by moving the adjustable mounting unit 106. The adjustable mounting unit 106 removably secures to the vehicle 101 so that the projector 104 can shine an image onto an external surface of the vehicle 101 while the vehicle 101 is in motion.

The adjustable mounting unit 106 is configured to attach to various types of vehicles 101 and trailer hitch receivers 108. In one embodiment, the adjustable mounting unit 106 is configured to attach to a typical trailer hitch receiver 108, as shown in FIG. 1. In most vehicles 101 which contain a trailer hitch receiver 108, the trailer hitch receiver 108 is mounted to the frame or chassis of the vehicle 101 and contains a rearward facing opening (not shown). The rearward facing opening is typically in the shape of a square and is configured to accept removable ball mounts, hitch bike racks, cargo carriers, and other accessories.

In the embodiment of FIG. 1, the vehicle mounted display device 100 attaches to the rear portion of a vehicle 101 by connecting the adjustable mounting unit 106 to the vehicle's trailer hitch receiver 108. In the embodiment of FIG. 1, the vehicle mounted display device 100 is attached to a trailer hitch receiver 108 which is located under the rear bumper of a vehicle 101.

Figure 2:
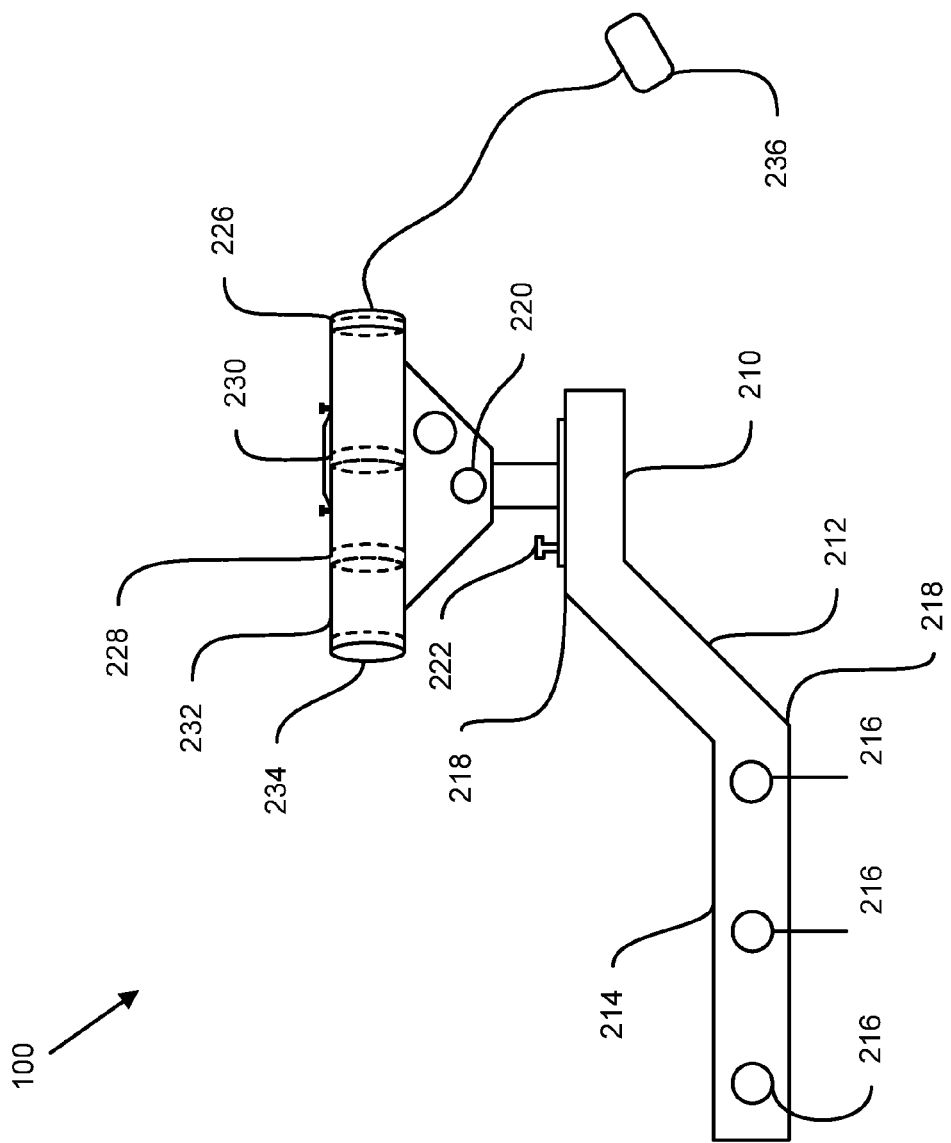
FIG. 2 is a side view of one embodiment of the invention.

As mentioned above, in one embodiment, the adjustable mounting unit 106 connects the projector 104 to the vehicle 101. The adjustable mounting unit 106 can be configured in many ways to achieve this objective. In the embodiment of FIG. 2, the adjustable mounting unit 106 contains three arms: the projector arm 210, the intermediate arm 212 and the connector arm 214. The intermediate arm 212 is located between, and connects, the projector arm 210 and the connector arm 214. In one embodiment, the connector arm 214 is configured to fit snuggly within the rearward facing opening of a typical trailer hitch receiver 108.

Figure 5:
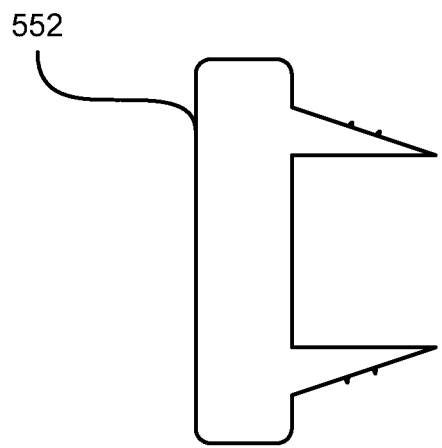
FIG. 5 is a side view of a sliding wedge collar in accordance with the present invention.

Most vehicles 101 contain either a class 1 or class II trailer hitch receiver 108. The class rating distinguishes the size of the rearward facing opening of the trailer hitch receiver 108 and the amount of weight that the trailer hitch receiver 108 can support. The connector arm 214 is sized differently in different embodiments so that it will fit in the desired class receiver. For example, in one embodiment, the connector arm is square and is sized to fit snuggly within a class 1 or class II trailer hitch receiver 108. In another embodiment, the connector arm 214 is square and is sized to fit snuggly within a class III or IV trailer hitch receiver 108. In yet another embodiment, the connector arm 214 is square and is sufficiently small in size to fit within any class of trailer hitch receiver. In this embodiment, any additional space between the connector arm 214 and the trailer hitch receiver 108 can be filled using a sliding wedge collar 552, as shown in FIG. 5.

As mentioned above, class I, II, III, and IV trailer hitch receivers 108 are rated according to the amount of weight which can safely be attached to the trailer hitch receiver 108. In one embodiment, the vehicle mounted display device 100 is configured to be light weight such that the total weight of the vehicle mounted display device 100 is less than the weight limit for all four classes of trailer hitch receivers 108.

In one embodiment, the adjustable mounting unit 106 is configured to attach to a typical tow-ball hitch rather than a square trailer hitch receiver 108. A typical tow-ball hitch contains a ball shaped hitch attachment rather than a typical square opening, such as those described above. In one embodiment, the adjustable mounting unit 106 is configured to attach to a typical 1 and ⅞ inch tow-ball. In other embodiments, the adjustable mounting unit 106 is configured to attach to one of a 1.97 inch, 2 inch and 2⁵⁄₁₆ inch diameter tow-ball. In certain embodiments, the connector arm 214 clamps onto the tow-ball with finger-like projections. In these embodiments, the connector arm 214 is configured to securely attach to the tow-ball while allowing articulating and swivel motion with respect to the tow-ball.

In another embodiment, the adjustable mounting unit 106 is configured to attach to a pin-and-jaw-type trailer hitch. In this embodiment, the connector arm 214 contains a flat section which contains a hole. The hole is sized to receive a pin which secures the connector arm 214 to the pin-and-jaw-type trailer hitch receiver 108. One of skill in the art will recognize other mechanisms that can be used to attach the vehicle mounted display device 100 to different types of trailer hitches receivers 108.

As shown in FIG. 2, the connector arm 214 may contain several sets of spaced holes 216. The sets of holes 216 are designed to align with a single set of holes in a typical trailer hitch receiver 108. When the set of holes of the trailer hitch receiver 108 is aligned with a single set of holes 216 of the connector arm 214, a corresponding hitch pin is placed through the aligned holes to hold the vehicle mounted display device 100 to the trailer hitch receiver 108. The connector arm 214 may contain several sets of holes 216 at different positions along the connector arm 214. By aligning a different set of holes 216 on the connector arm 214 with the single set of holes on the trailer hitch receiver 108, the vehicle mounted display device 100 can be secured at different horizontal distances from the body of the vehicle 101.

Connecting the vehicle mounted display device 100 to a pre-existing trailer hitch receiver 108 is advantageous because the vehicle 101 does not need to be modified in order for the vehicle mounted display device 100 to function properly. In other words, the vehicle 101 can be quickly and easily customized through the use of a projected image by simply attaching the vehicle mounted display device 100 to the vehicle's trailer hitch receiver 108 and then turning on the projector 104. For example, a vehicle 101 with a class 1 trailer hitch receiver 108 can be customized by placing the connector arm 214 within the trailer hitch receiver 108 and connecting the projector 104 to a power source that typically accompanies a trailer hitch receiver 108.

The vehicle mounted display device 100 is configured, in one embodiment, such that it does not impede the normal function of the vehicle 101. In many embodiments, this is accomplished by adjusting the positioning of the adjustable mounting unit 106 so that the projector 104 and the adjustable mounting unit 106 are a safe distance from both the vehicle 101 and a road upon which the vehicle 101 is moving. In one embodiment, the vehicle mounted display device 100 is positioned so that exterior doors of the vehicle 101 may still open and close while the vehicle mounted display device 100 is attached to the vehicle 101. In one embodiment, the vehicle mounted display device 100 is configured to remain attached to the vehicle 101 while the vehicle 101 is in motion so that the vehicle mounted display device 100 functions while the vehicle 101 is moving. In many embodiments, the vehicle mounted display device 100 need not be removed to perform common driving tasks such as opening and closing vehicle doors, moving the vehicle 101 in a reverse direction, normal driving, and opening and closing a tail gate door. In the embodiment of FIG. 1, a tail gate door can be opened and closed without removing the vehicle mounted display device 100.

An image that is projected by the vehicle mounted display device 100 can be adjusted through the use of the adjustable mounting unit 106. By adjusting the position of the adjustable mounting unit 106 a user can choose the position of the image projected by the vehicle mounted display device 100. The image projected by the vehicle mounted display device 100 can also be adjusted by adjusting the location, orientation and focus of the projector 104. Both the projector 104 and the adjustable mounting unit 106 can be adjusted simultaneously in order to position the projected image on an outer surface of the vehicle 101. Additionally, the size of the projected image can be changed by adjusting the adjustable mounting unit 106 and by adjusting the projector 104. When the projector 104 and the adjustable mounting unit 106 are moved away from the vehicle 101, the projected image becomes larger.

Some vehicles 101 have glossy, highly-reflective surfaces which may not show a clear projected image. In order to make the projected image visible and clear on any type of vehicle 101 surface, some embodiments contain a mat 109 which is placed on the outer surface of the vehicle 101, as shown in FIG. 1. In one embodiment, a magnetic mat 109 is used which magnetically attaches to an outer surface of a vehicle 101. The mat 109 remains attached to the vehicle 101 while the vehicle 101 is in motion. In another embodiment, the mat 109 is attached to the surface of a vehicle 101 through the use of an adhesive. Those of skill in the art will recognize other means for attaching the mat 109 to an outer surface of a vehicle 101. A user can position the mat 109 on any exterior surface of a vehicle 101 onto which he or she desires to project an image. In the embodiment of FIG. 1, the mat 109 is attached to the center of the tailgate of a truck.

In one embodiment, the mat 109 has a matte finish. In another embodiment, the mat 109 is made of a clear material so that the color of the exterior surface of the vehicle 101 can be seen through the mat 109. In one embodiment, the mat 109 is a transparent sticker with a matte finish. In one embodiment, the mat 109 is made from a white material with a matte finish. In one embodiment, the mat 109 is made from a material supplied from Regional Supply called Oracle 631 exhibition and is a transparent material with a matte finish. In another embodiment, the mat 109 is made from a different product supplied by Regional Supply called Magna 24 and is a white magnetic sheet. In another embodiment, the mat 109 is a magnetic screen which is magnetically attached to an outer surface of an automobile.

In another embodiment, an image is projected directly onto an outer surface of a vehicle 101 without the use of a mat 109.

This may be done for any vehicle 101, but may present the clearest image on a vehicle 101 with a white outer surface.

Figure 3:
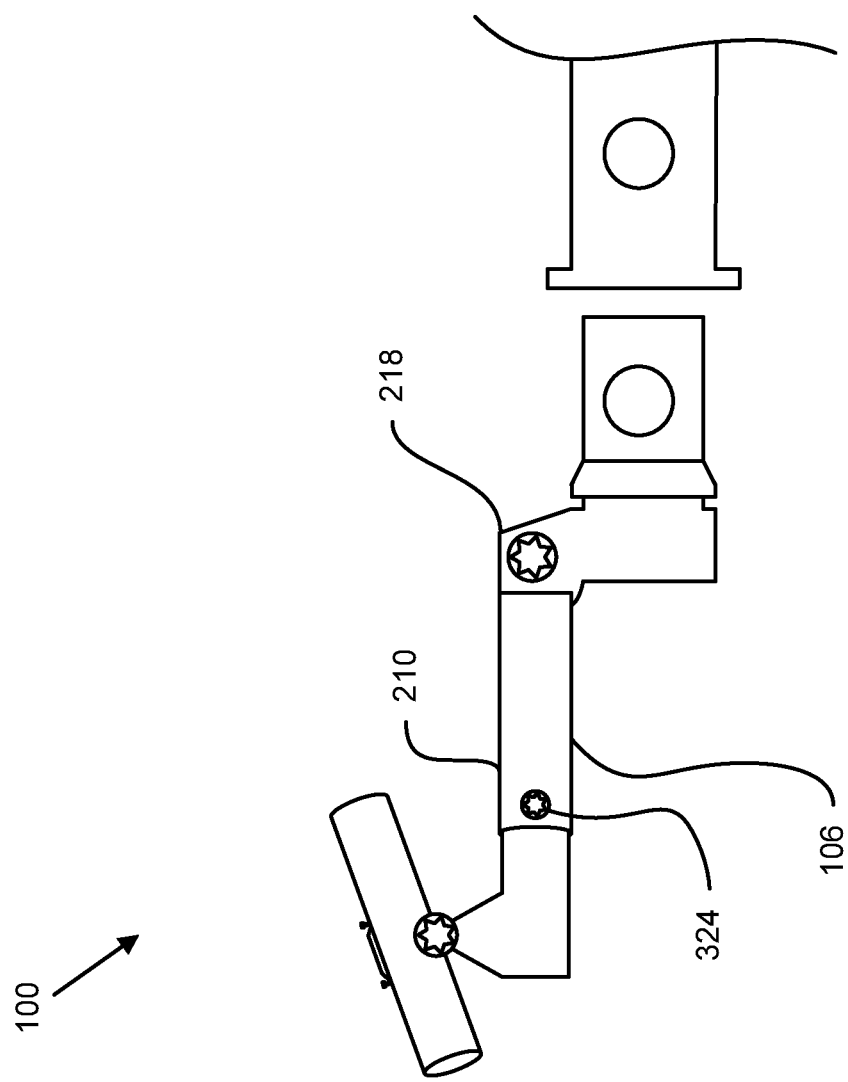
FIG. 3 is a side view of another embodiment of the invention.
Figure 4A:
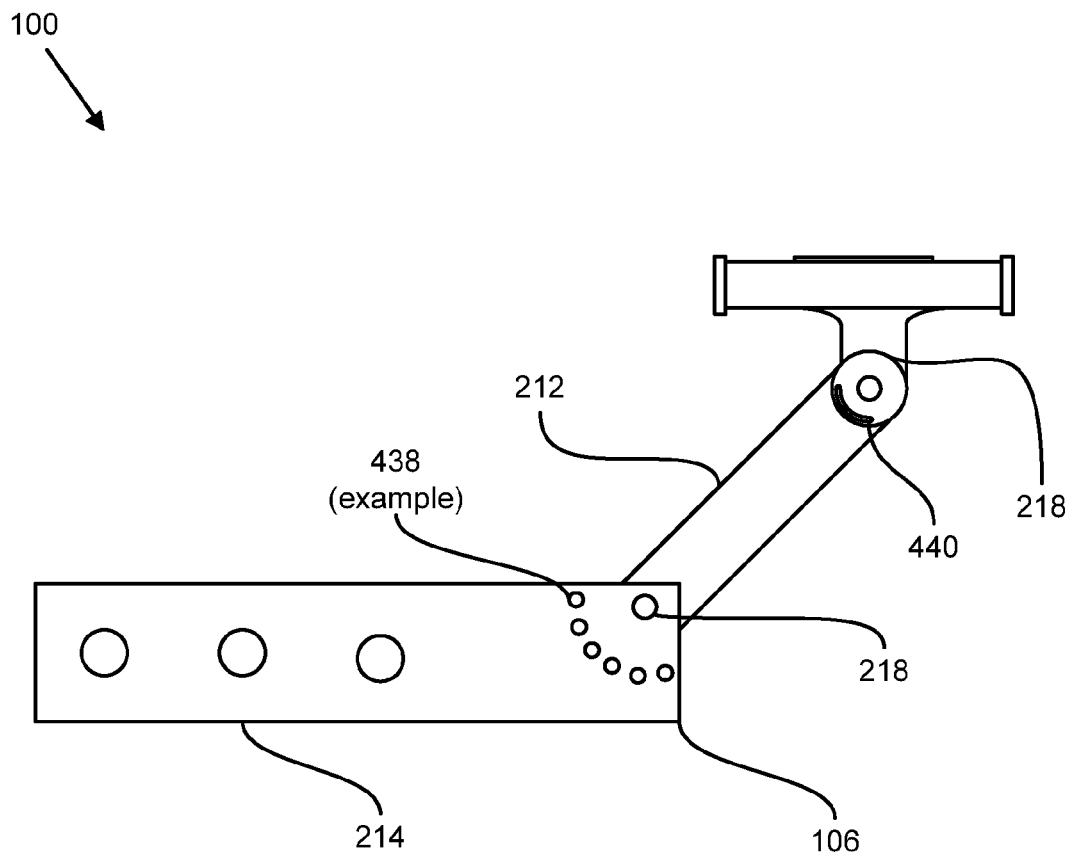
FIG. 4A is a side view of another embodiment of the invention.
Figure 4C:
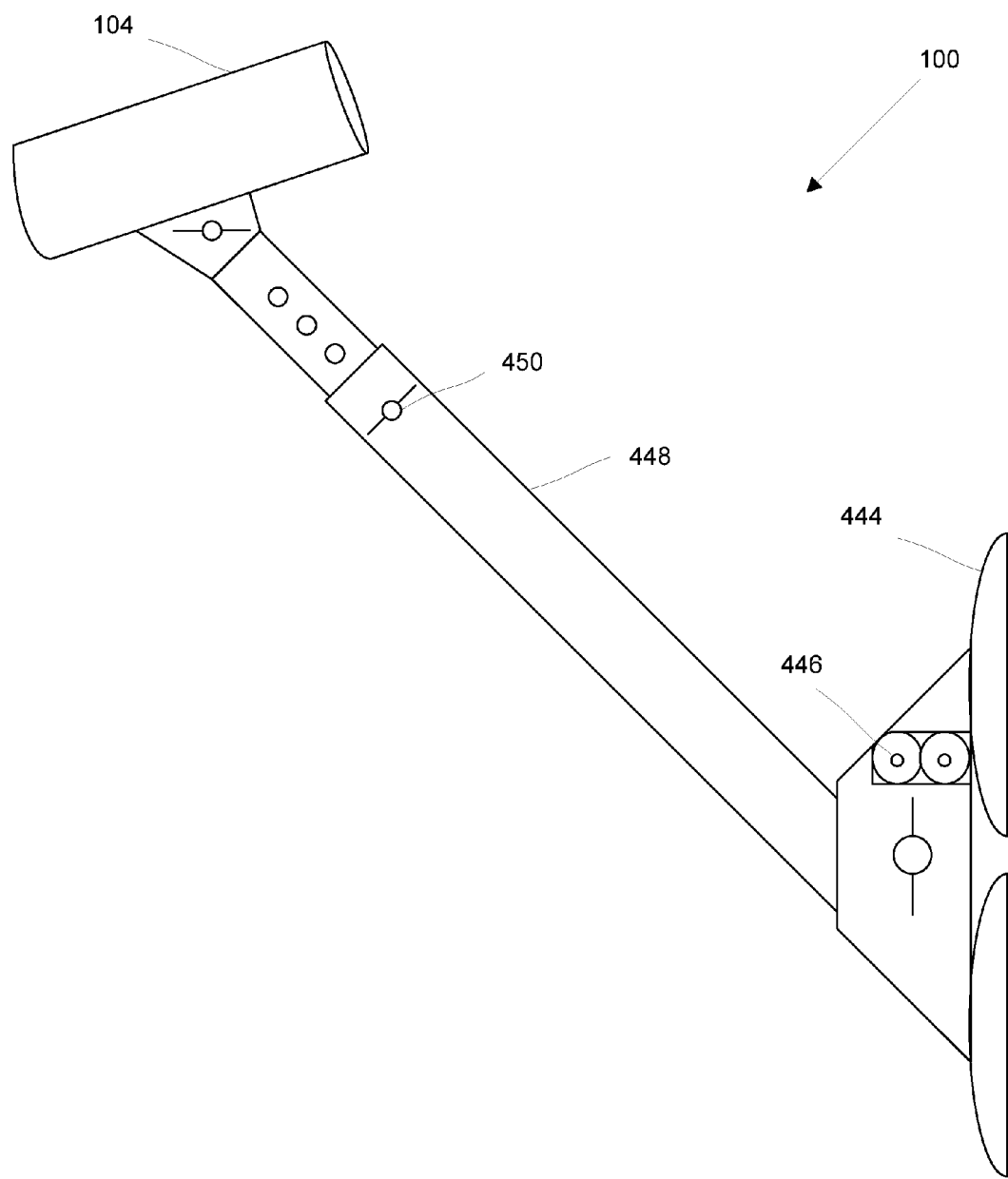
FIG. 4C is a side view of another embodiment of the invention.

Now directing the focus to FIG. 2, a side view of the vehicle mounted display device 100 is shown. The vehicle mounted display device 100 contains an adjustable mounting unit 106, a projector 104, and a power cord 236. As shown in FIGS. 2, 4A, and 4B, certain embodiments of the adjustable mounting unit 106 contain a connector arm 214, an intermediate arm 212, and a projector arm 210. As shown in FIGS. 1, 3, and 4C, however, certain embodiments contain only a connector arm 214 and a projector arm 210. In these embodiments, the connector arm 214 is directly coupled to the projector arm 210 without the use of an intermediate arm 212. The adjustable mounting unit 106 is not required to contain a certain number of arms but may contain one arm or several arms. For example, in one embodiment, the adjustable mounting unit 106 may consist solely of a connector arm 214 (not shown). A lateral end of the connector arm 214 may connect to a typical trailer hitch receiver 108 while an opposite lateral end may connect with the projector 104. The projector 104 may be movably connected with the connector arm 214 such that it can move in the horizontal and vertical directions. In this manner, the image projected by the projector 104 can be placed on an outside surface of a vehicle 101 in several different locations. One of skill in the art will recognize that the orientation and number of arms 210, 212, 214 can be changed without departing from the claimed invention.

In one embodiment, connection points 218 between the connector arm 214, intermediate arm 212 and projector arm 210 are fixed such that the connector arm 214, intermediate arm 212 and projector arm 210 are fixed in relation to each other. The intermediate arm 212 may connect the connector arm 214 and the projector arm 210 and may be angled such that the projector arm 210 is elevated above the connector arm 214.

In other embodiments, such as those in the FIGS. 3, 4A, and 4B, the connection points 218 between the connector arm, intermediate arm 212 and projector arm 210 are movable such that the arms 210, 212, 214 can move in relation to each other. In one embodiment, a user can loosen the connection points between the arms 210, 212, 214, place the projector 104 in the desired location and orientation, and then tighten the connection points 218 between the arms 210, 212, 214, fixing the orientation and position of the adjustable mounting unit 106. When the connection points 218 between the arms 210, 212, 214 are tightened, the arms 210, 212, 214 remain substantially fixed with relation to each other. When the connection points 218 between the arms 210, 212, 214 are loosened, the arms 210, 212, 214 can be moved in relation to each other. The connection points 218 can be tightened and loosened through the use of a bolt and wing nut fastener, a bolt and nut fastener, a friction fit, or other adjustable fastener. One of skill in the art will recognize other mechanisms which can be used to loosen and tighten the connection points 218 between the arms 210, 212, 214. By moving the adjustable mounting unit 106, the size, shape, focus, and position of a projected image can be changed. If a bigger image is desired, the adjustable mounting unit 106 is moved away from the vehicle's surface.

In the embodiment of FIG. 2, the projector 104 is movably attached to the projector 104 arm. The projector 104 is able to rotate horizontally so that the projected image can be placed at different lateral positions on the exterior surface of the vehicle 101. The projector 104 also contains a pivot point 220 which allows the projector 104 to rotate in a vertical plane so that the projected image can be placed at different vertical positions on the exterior surface of the vehicle 101. By rotating the projector 104 in both the horizontal and vertical planes, the projector 104 can be positioned at different radial positions. As was the case with certain embodiments of the adjustable mounting unit 106, the projector 104 contains tightenable connection points 218 to allow the projector 104 to be adjustable.

In one embodiment, the adjustable mounting unit 106 further comprises a safety feature configured to prevent the projector 104 from pointing away from the outer surface of the vehicle 101. The safety feature may contain notches or plates that prevent the arms of the adjustable mounting unit 106 from rotating away from the vehicle 101. FIG. 2 shows a safety feature which includes a screw 222 which is positioned to prevent the projector 104 from rotating laterally to face away from the outer surface of the vehicle 101 onto which the vehicle mounted display device 100 is attached. In other embodiments, a protrusion, slot and screw, or other device or method may be used to prevent the projector 104 from facing away from the outer surface of the vehicle 101 onto which it is attached.

In one embodiment, at least one of the connector 214, intermediate 212, and projector 210 arms is telescopic. The telescoping movement allows a user to position the projector 104 such that the image projected on a surface of the vehicle 101 can be changed in size and focus. FIG. 3 shows one embodiment in which the adjustable mounting unit 106 contains a telescopic projector arm 210. The embodiment of FIG. 3 also includes a slider lock 324 to secure the telescoping movement of the connector arm 214. The slider lock 324 locks portions of the telescoping arm so that it is fixed in relation to the vehicle 101.

In one embodiment, the apparatus is completely telescopic, which allows the invention to fold up and compactly fit inside the receiver hitch.

Referring again to FIG. 2, the vehicle mounted display device 100 contains a projector 104 which is configured to project an image onto an outer surface of a vehicle 101. The projector 104 can be any type of device that can project an image onto a surface. In one embodiment, the projector 104 contains a light source 226, at least one lens 228 and a cavity configured to receive an image cartridge 230. The light source 226 is contained on one lateral end of the projector 104 and the image cartridge 230 is situated between the light source 226 and the lens 228.

The image projected by the projector 104 can be focused by moving the image cartridge 230 with respect to the lens 228. In other embodiments, the projector 104 may contain more than one lens 228. Each lens 228 may be movable with respect to the image cartridge 230 so that the image can be focused. The light source 226 within the projector 104 shines light through the image cartridge 230 and the lens 228 and is then projected onto an outer surface of a vehicle 101. The image that is projected onto the vehicle 101 surface is determined by the image contained on the image cartridge 230.

The projector 104 may contain an outer shell 232. In one embodiment, the outer shell 232 is a waterproof and weather proof outer shell 232. In another embodiment, the outer shell 232 is made of a metal material so that it can withstand collisions with rocks and other debris while the vehicle 101 is in motion. In another embodiment, the outer shell 232 is made of a hard plastic material.

FIG. 2 shows a projector 104 with at least one lens 228. The lens 228 is situated on one side of the image cartridge 230 while the light source is placed on an opposite side of the image cartridge 230. In one embodiment, the projector 104 contains only one lens 228. In a variation of this embodiment, the projector 104 contains a lens 228 and a clear plastic cover on a projecting end of the projector 104. The clear plastic cover prevents water and debris from entering the projector 104. In another embodiment, the projector 104 contains a keystone lens 234 situated on the projecting end of the projector 104. In this embodiment, the keystone lens 234 acts as a corrective lens 228 which is used to sharpen the image and also helps to keep moisture and debris from entering the projector 104.

FIG. 2 also shows the orientation and position of the image cartridge 230 within the projector 104. As mentioned above, in one embodiment, the image cartridge 230 can be moved laterally to focus the image. The image cartridge 230 may be moved through the use of a rotary dial that is disposed on an outer surface of the projector 104. The rotary dial may move the image cartridge 230 with respect to the lens 228 to focus the projected image. In another embodiment, the image cartridge 230 may be moved through the use of a tab which is attached to the image cartridge 230 and is accessible on an outer surface of the projector 104.

In one embodiment, the image cartridge 230 contains custom images. The custom images can be designed by a user or chosen from a database of images. In one embodiment, the image cartridge 230 is configured to contain an image of a company's logo. The company logo can then be displayed on an outer surface of a vehicle 101. In another embodiment, the image cartridge 230 contains an image of a sports team logo which can be displayed on an outer surface of a vehicle 101. In another embodiment, the image cartridge 230 may contain a seasonal image. In another embodiment, the image cartridge 230 may contain a vehicle maker's logo.

In one embodiment, the image cartridge 230 is composed of a clear plastic slide with a rigid frame. When light is shined through the clear plastic slide and through the lenses 228, 234, an image is projected onto the vehicle 101. The clear plastic slide may have an image printed thereon so that an image is projected onto the outer surface of the vehicle 101.

FIG. 2 also shows that the projector 104 contains a light source 226. The light source 226 is situated on the opposite lateral end of the projector 104 from a projector 104 opening. The light source 226 is configured to shine through the image cartridge 230 to project an image onto the outer surface of a vehicle 101. In one embodiment, the light source 226 may be an LED. In one embodiment, the light source 226 is a single LED. In another embodiment, the light source 226 contains several LEDs. In another embodiment, the light source 226 is a light bulb. One of skill in the art will recognize other light sources 226 which can be placed in the projector 104 to project an image onto a surface of a vehicle 101.

In one embodiment, the vehicle mounted display device 100 also contains a power source. In one embodiment, the power source is a battery which is contained within the adjustable mounting unit 106. In another embodiment, the power source is a battery which is contained within the projector 104. In the embodiment of FIG. 2, the power source is external to the vehicle mounted display device 100 and is connected to the vehicle mounted display device 100 through a power cord 236.

Vehicles 101 which contain trailer hitch receivers 108 typically contain a trailer light receptacle which is configured to power the lights of a trailer. The vehicle mounted display device 100 may contain a power cord 236 which is configured to connect to a typical trailer light receptacle. In those vehicles 101 which contain a trailer hitch receiver 108, the trailer light receptacle is typically very close to the trailer hitch receiver 108, such that the trailer light receptacle is a very convenient power source.

FIG. 4A shows one embodiment of the vehicle mounted display device 100 in which the adjustable mounting unit 106 contains a connector arm 214 and an intermediate arm 212 which are adjustably attached to each other. The connector arm 214 contains several pairs of openings 438 and the intermediate arm 212 contains a spring loaded pin (not shown) which protrudes through the openings 438 in the connector arm 214 when the spring loaded pin is aligned with a pair of openings 438 in the connector arm 214. When the spring loaded pin protrudes through the openings 438 in the connector arm 214, the connector arm 214 is fixed in relation to the intermediate arm 212. The spring loaded pin can then be retracted through the openings 438 in the connector arm 214 and re-positioned in another pair of openings 438 in the connector arm 214. In this manner, the intermediate arm 212 can be oriented at different angles in relation to the connector arm 214.

The intermediate arm 212 is also adjustably attached to the projector 104. The intermediate arm 212 contains a slot 440 which is designed to receive a pin contained on the projector 104 arm. The slot 440 is shaped in a semi-circular orientation such that when the pin moves within the slot 440, the projector 104 arm moves in a vertical plane. In this embodiment, the motion of the projector 104 arm is limited as the pin contacts extreme ends of the slot 440.

FIG. 4B shows another embodiment of vehicle mounted display device 100 in which the adjustable mounting unit 106 contains a connector arm 214, an intermediate arm 212, and a projector arm 210. A compressible foam rubber collar 442 is pushed tight against the receiver hitch to keep the vibrations dampened.

FIG. 4C shows another embodiment of vehicle mounted display device 100 in which the apparatus consists of suction cups 444 in order to attach to a vehicle. A battery compartment is shown which holds batteries 446 to provide power to the projector. The arms contain pivots 448 which can be tightened or loosened in order to adjust the arms or projector to the desired length or angle.

FIG. 5 shows one embodiment of a sliding wedge collar 552. In one embodiment, the adjustable mounting unit 106 contains a sliding wedge collar 552 which is made of a resilient, compressible material, to further secure the adjustable mounting unit 106 to the trailer hitch receiver 108. As discussed briefly earlier, the sliding wedge collar 552 is placed in the trailer hitch receiver 108 before the adjustable mounting unit 106. The adjustable mounting unit 106 is then placed within the sliding wedge collar 552.

The material of the sliding wedge collar 552 is compressed between the adjustable mounting unit 106 and the trailer hitch receiver 108. In this manner, movement and force transferred from the vehicle 101 to the vehicle mounted display device 100 is dampened. This may be important if the vehicle mounted display device 100 is used while the vehicle 101 is in motion. In this manner, road noise, vibrations and bumps are dampened so that the adjustable mounting unit 106, image cartridge 230 and light source are less likely to be damaged due to the vibrations.

In one embodiment, the adjustable mounting unit 106 is sufficiently small to fit within a Class I or a Class II trailer hitch receiver 108. The adjustable mounting unit 106, however, may still be used in Class III-IV trailer hitch receivers 108 by placing sliding wedge collars 552 of different sizes in the trailer hitch receiver 108 before placing the adjustable mounting unit 106. The sliding wedge collar 552 conforms to the space that is available between the trailer hitch receiver 108 and the adjustable mounting unit 106.

Figure 6:
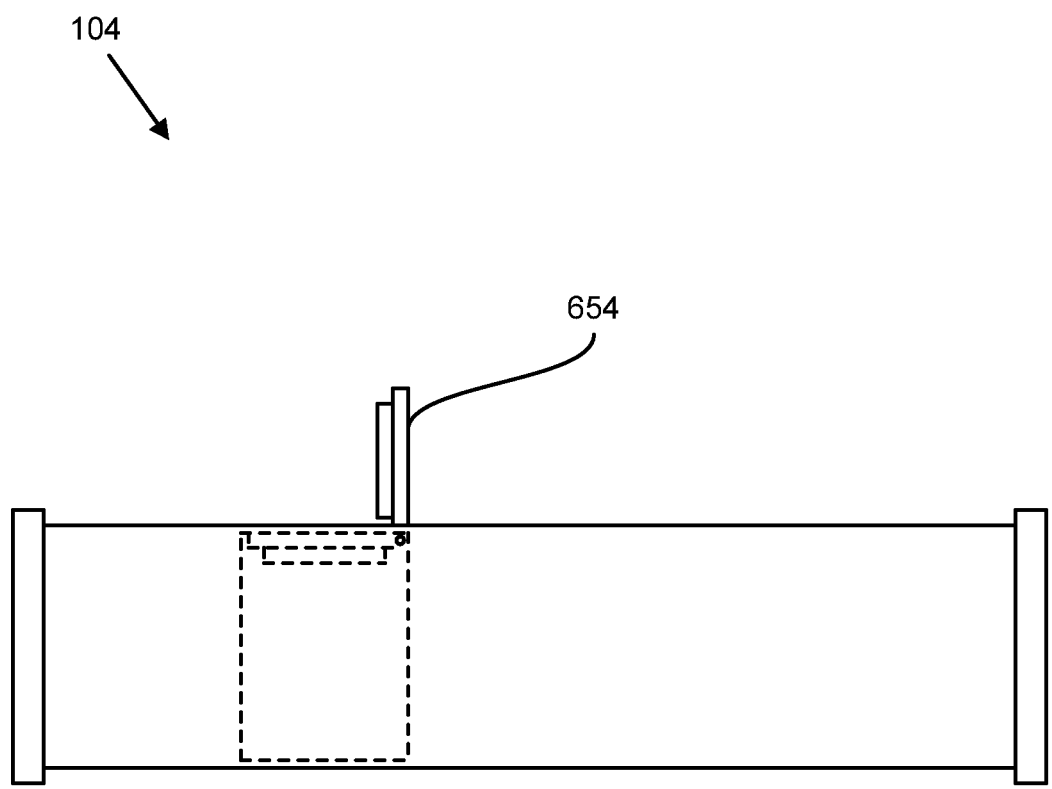
FIG. 6 is a side view of a projector in accordance with the present invention.

FIG. 6 shows one embodiment of the projector 104 in which the image cartridges (not shown) are changed manually. In this embodiment, a lid 654 is rotated about an axis to expose a cavity within the projector 104. The lid 654 can be closed over the cavity, onto a surface of projector 104. When the lid 654 is rotated away from the cavity, an image cartridge 230 can be placed within the cavity in the projector 104. In one embodiment, the connection between the projector 104 surface and the lid 654 is waterproof. In certain embodiments, the lid 654 is secured to the projector 104 when the lid 654 is in a closed position through the use of a screw. In other embodiments, the lid 654 is secured to the projector 104 when the lid 654 is in the closed position by a snapping mechanism. One of skill in the art will recognize other methods of securing the lid 654 to the projector 104 when the lid 654 is in the closed position.

Figure 7A:
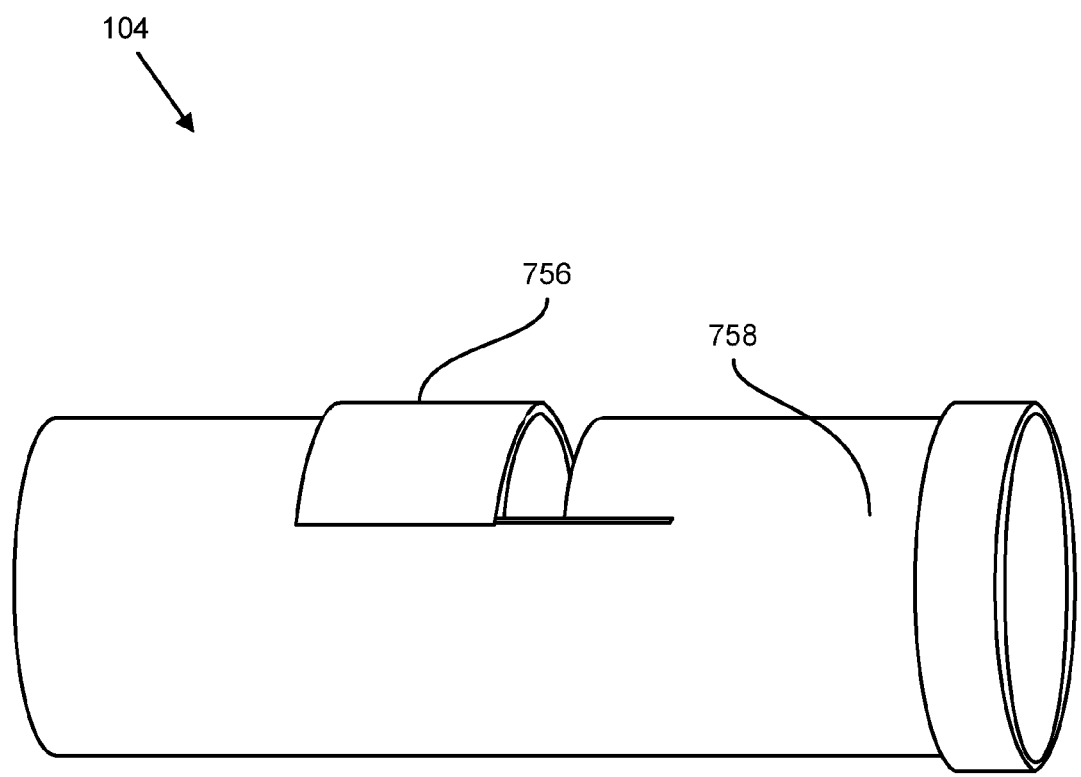
FIG. 7A is a perspective view of one embodiment of a projector in accordance with the present invention.

In the embodiment of FIG. 7A, the projector 104 contains a sliding cover 756. The sliding cover 756 moves horizontally to expose the cavity of the projector 104. In the embodiment of FIG. 7A, the sliding cover 756 slides on a track 758 which is placed on an outer surface of the projector 104. The track 758 allows the sliding cover 756 to slide away from the cavity but does not allow the cover to detach from the projector 104. Again, in certain embodiments, the connection between the sliding cover 756 and the cavity is waterproof. In one embodiment, a single image cartridge 230 can be placed in the projector 104 when the sliding cover 756 is displaced. In another embodiment, more than one image cartridge 230 can be placed in the projector 104 when the sliding cover 756 is displaced.

In one embodiment, the projector 104 accepts several image cartridges 230 at one time so that the image cartridges 230 can be rotated and changed without re-opening the projector 104. In another embodiment, the image cartridges 230 are rotated automatically so that the projected image is an animated image. The image cartridges 230 may be held in a carousel type holder, a straight line holder, or another type of image cartridge holder. One of skill in the art will recognize other methods of holding multiple image cartridges 230.

Figure 7B:
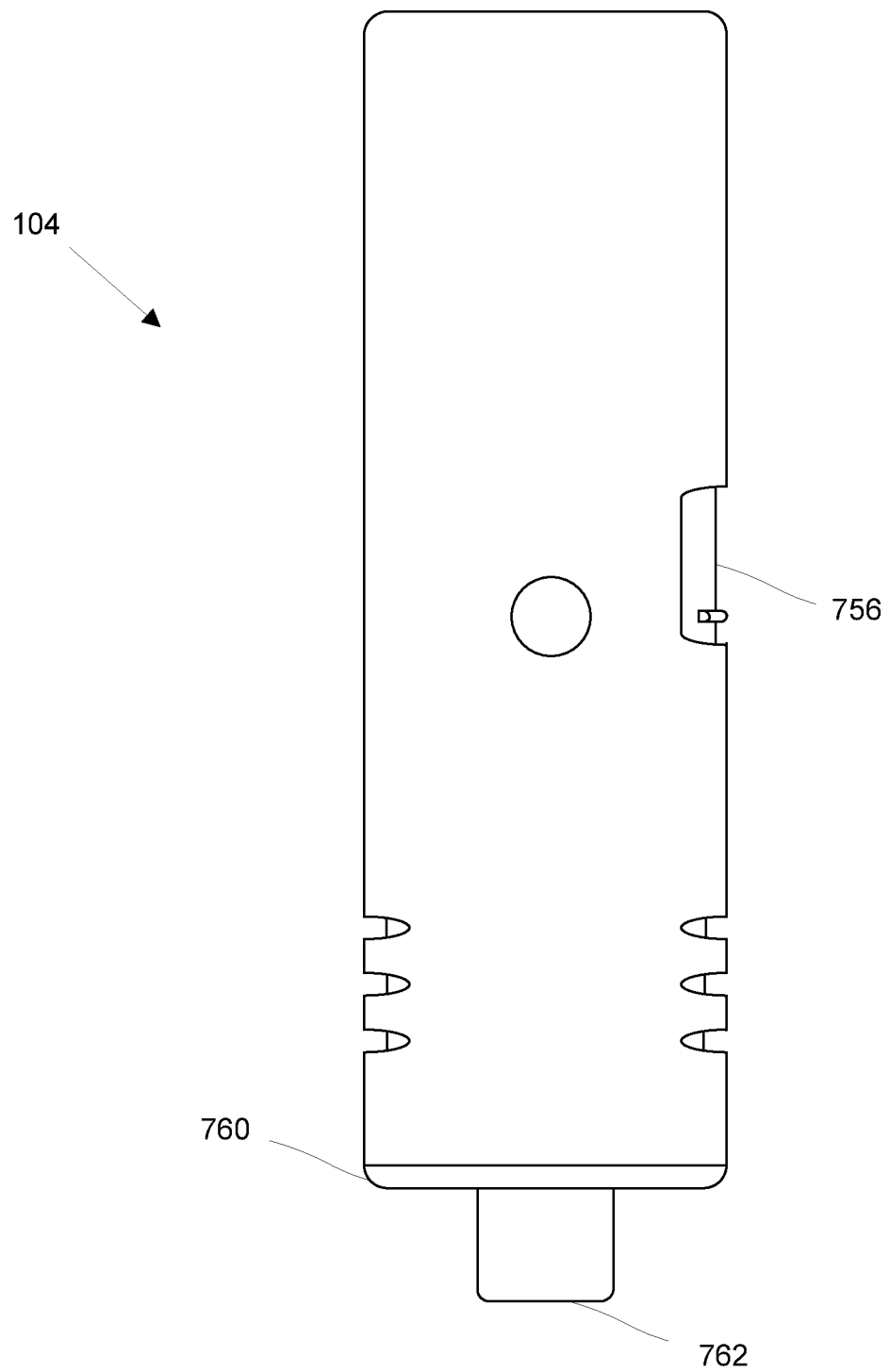
FIG. 7B is a side view of another embodiment of a projector in accordance with the present invention.

FIG. 7B shows one embodiment of the projector 104 in which there is a sliding cover 756 which can open and close over image cartridge 230 (not shown). A focus element 760 allows the light to move forward or backward in order to focus the image. A power source 762 is connected to the back of the projector which can be plugged into the trailer hitch receiver power source.

Figure 7C:
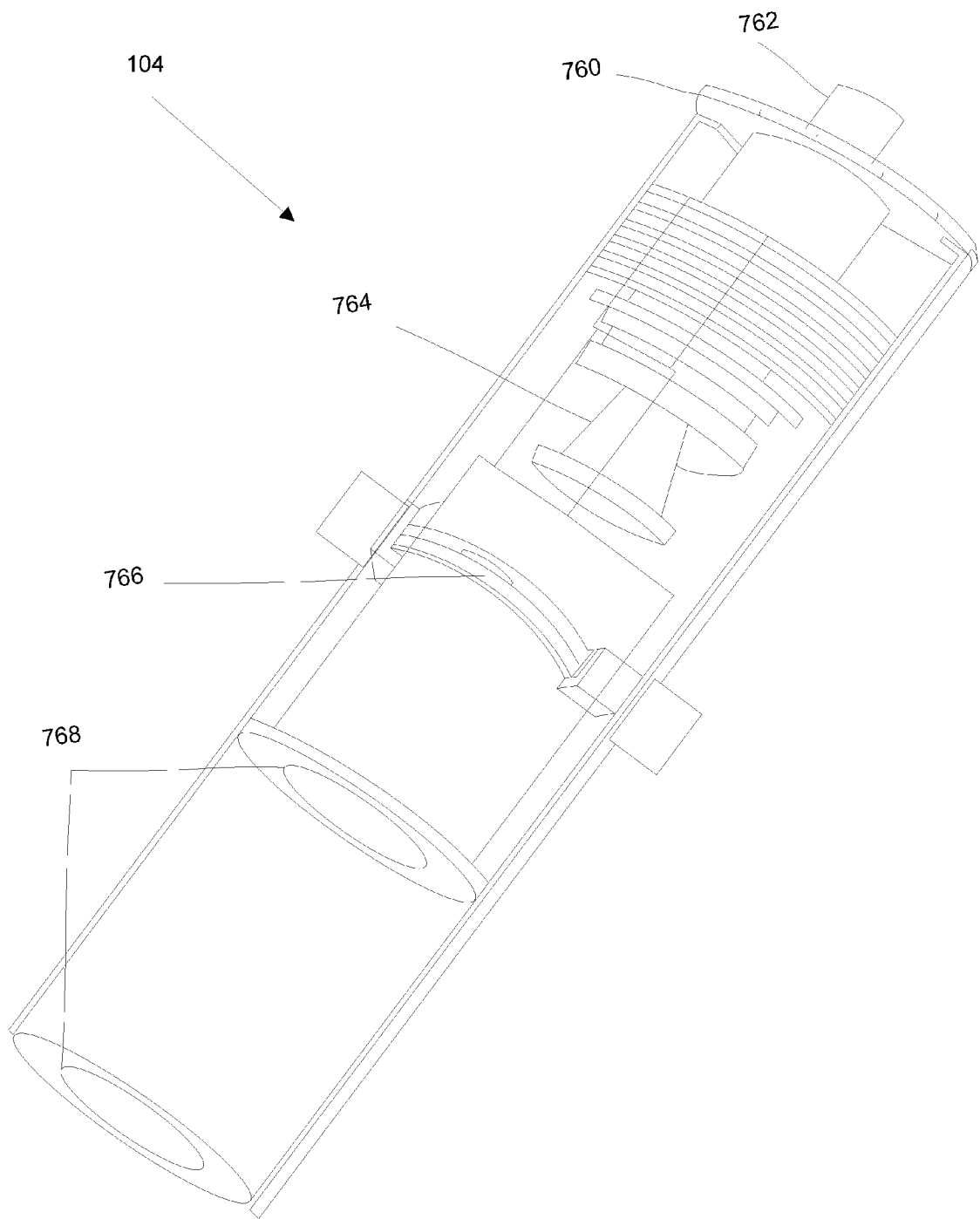
FIG. 7C is a cut-away perspective view of one embodiment of a projector in accordance with the present invention.

FIG. 7C shows a cut-away perspective view of the projector 104. A light source 764 is in the projector which can be adjusted forward or backward with focus element 760. Image cartridge 766 is placed inside the projector between lens 768 and light source 764. This particular embodiment consists of two lenses 768 followed by the image cartridge 766 and light source 764.

Figure 8:
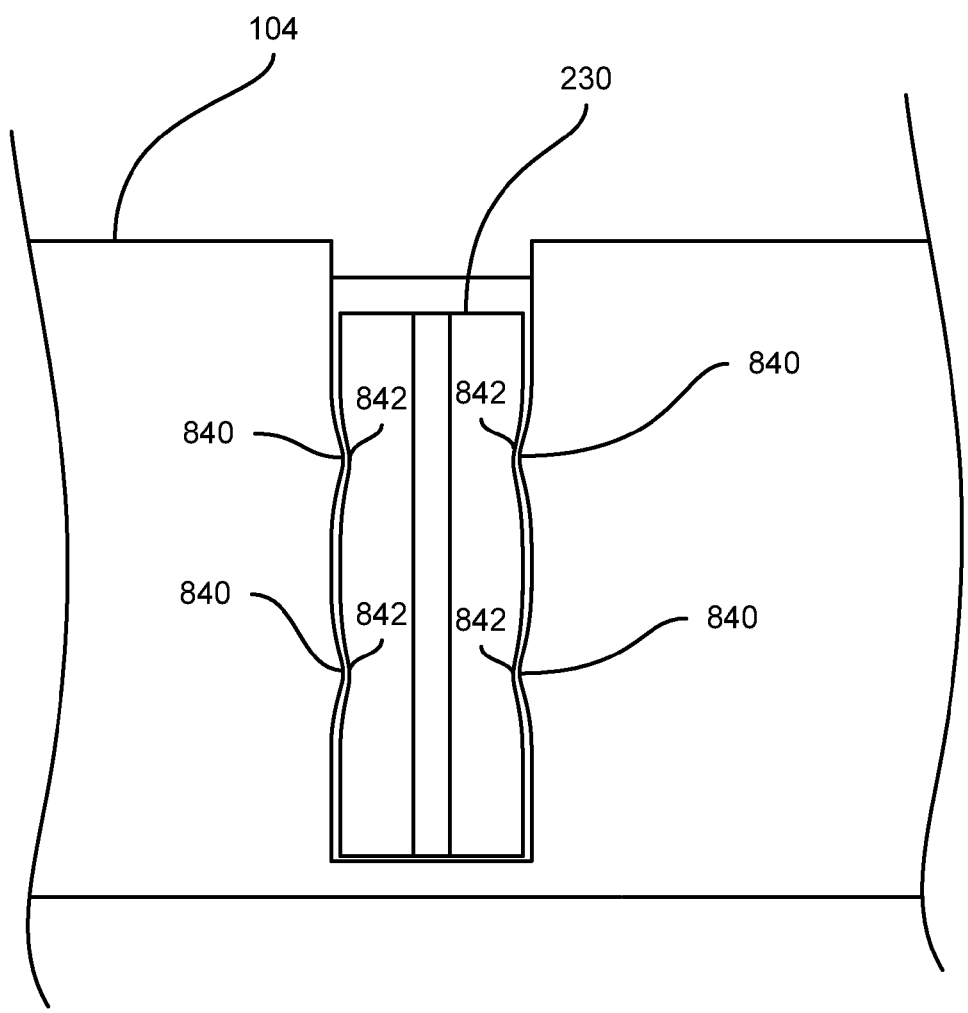
FIG. 8 is a cut-away side view of one embodiment of a projector in accordance with present invention.
Figure 9:
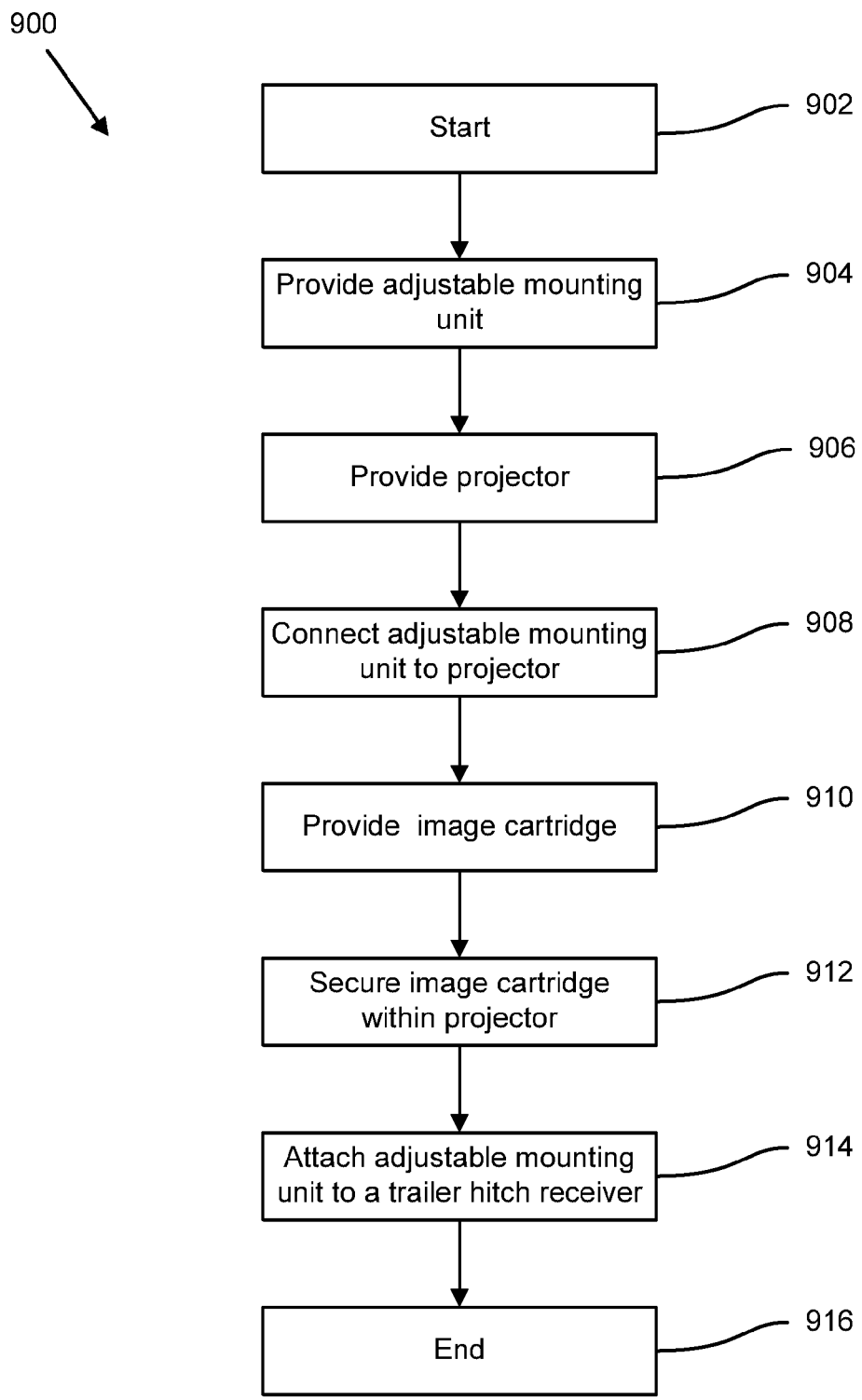
FIG. 9 is a schematic representation of one embodiment of a method in accordance with the present invention.

FIG. 8 shows one embodiment of an image cartridge 230 contained within the projector 104. The projector 104 contains a cavity which contains protrusions 840 that mate with corresponding cavities 842 in the image cartridge. The plastic frame holds the image cartridge 230 in the proper orientation by securing the protrusions 840 to the corresponding cavities 842. In one embodiment, the image cartridge 230 contains a rectangular, clear plastic sheet similar to a 35 mm slide.

In one embodiment, the vehicle mounted display device 100 is programmable such that the activation of the projector 104 corresponds with certain actions of the user. For example, in one embodiment, the projector 104 is activated when the user presses the brake pedal. In another embodiment, the projector 104 is activated when the user turns on the vehicle lights. In one embodiment, the projector 104 is turned on and off through the use of a button or switch within the vehicle 101. Those of skill in the art will recognize other actions which a user can use to activate the projector 104.

A system to project an image onto the exterior surface of a vehicle 101 is also disclosed which contains an adjustable mounting unit 106 which can be secured to a trailer hitch receiver 108 of a vehicle 101. A projector 104 is attached to the adjustable mounting unit 106 and is thus secured in relation to the vehicle 101. The adjustable mounting unit 106 connects to a vehicle 101 on one end and connects the projector 104 on an opposite end. The projector 104 is configured to project an image onto an outer surface of a vehicle 101. The position and orientation of the projector 104 can be changed by changing the orientation and position of the adjustable mounting unit 106. The system also contains an image cartridge 230. The image cartridge 230 is contained within the projector 104 and can be exchanged for replacement image cartridges 230.

A method 900 is also disclosed for projecting an image onto an outer surface of a vehicle 101. The method 900 starts 902 and an adjustable mounting unit 106 is provided 904. The adjustable mounting unit 106 is configured to secure to a trailer hitch receiver 108 of a vehicle 101. A projector 104 is then provided 906. The adjustable mounting unit 106 connects 908 with the projector 104 and allows the projector 104 to be positioned so that an image is projected onto an outer surface of the vehicle 101 to which the adjustable mounting unit 106 it attached. An image cartridge 230 is then provided 910. The image cartridge 230 is designed to be placed within the projector 104. The image cartridge 230 is secured 912 within the projector 104. The adjustable mounting unit 106 is then attached 914 to a trailer hitch receiver 108 of a vehicle 101. Then method 900 then ends 916.

Figure 10:
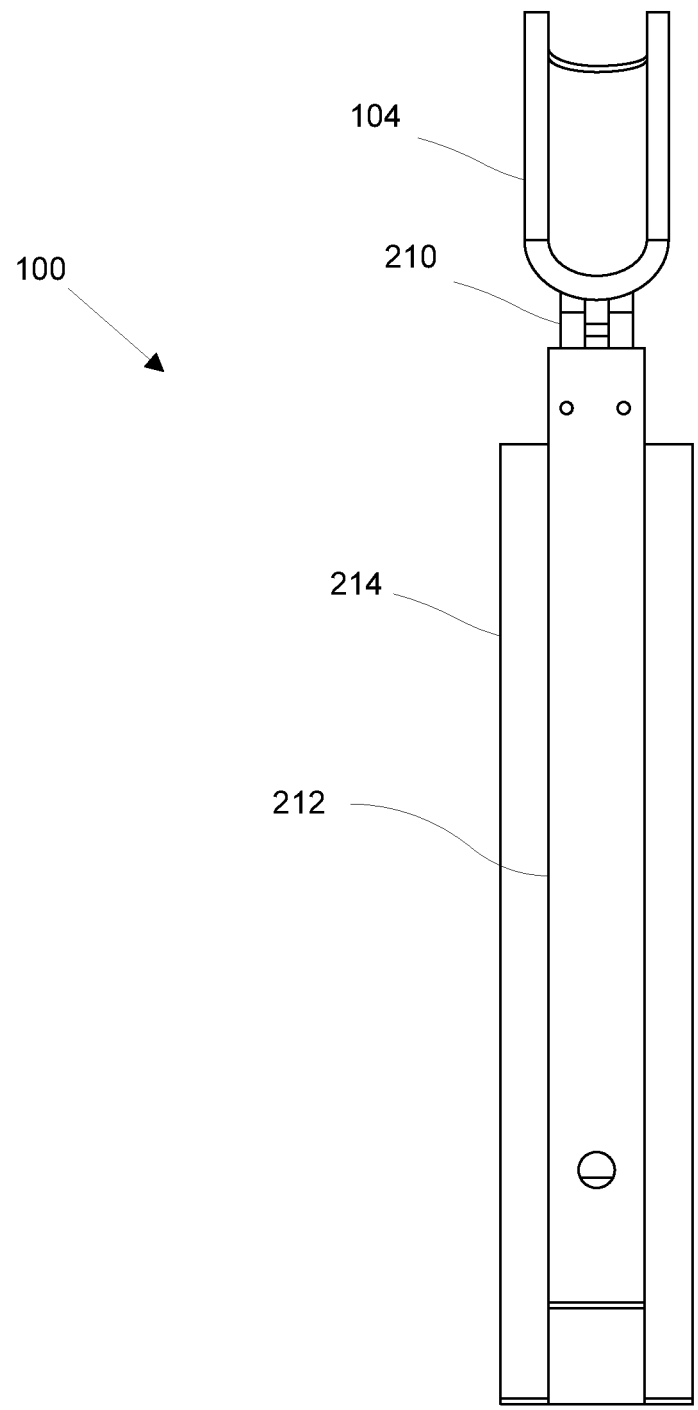
FIG. 10 is a top view of the present invention in its folded position.

FIG. 10 shows a top view of the apparatus folded into itself compactly. The connector arm 214, intermediate arm 212, and projector arm 210 are shown as they fit together compactly. One embodiment of the apparatus in a similar way can slide all the way into the receiver hitch and can therefore be out of the way and safely kept attached to a vehicle.

Figure 11A:
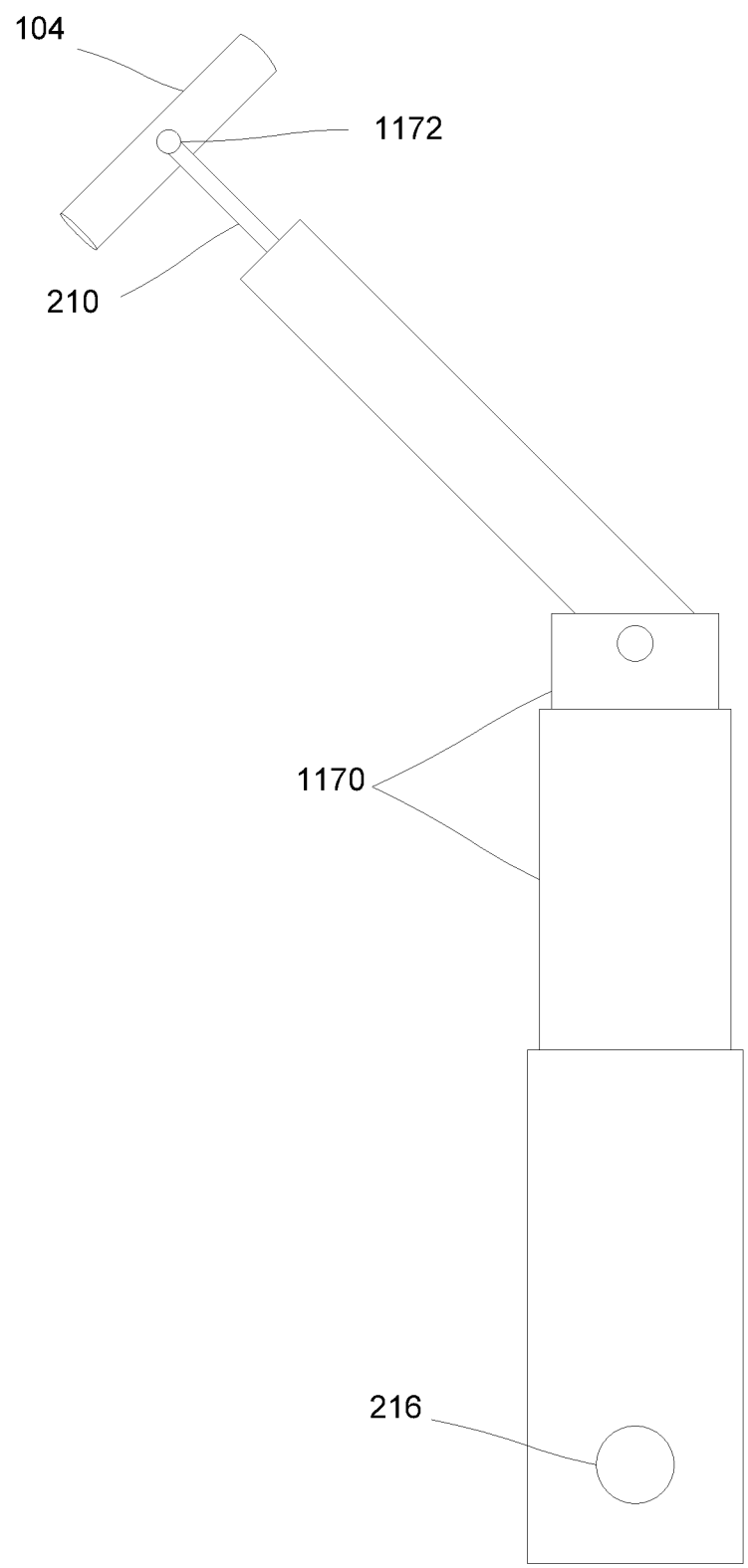
FIG. 11A is a side view of another embodiment of the invention.

FIG. 11A represents a side view of another embodiment of the invention. It contains telescopic arms 1170 that may extend or retract completely into the adjustable mounting unit. A swivel head 1172 allows the projector 104 to swivel into a position that allows it to retract inside the unit.

FIGS. 11B and 11C also represent embodiments of the invention. This embodiment folds up neatly into the vehicle's receiver hitch. All one would see is a lockable hatch when folded up. Similar to many other embodiments, there is a hold 216 which is held in the receiver hitch with a hitch pin. There is at least one telescopic arm 1170 which can extend and retract.

Figure 11D:
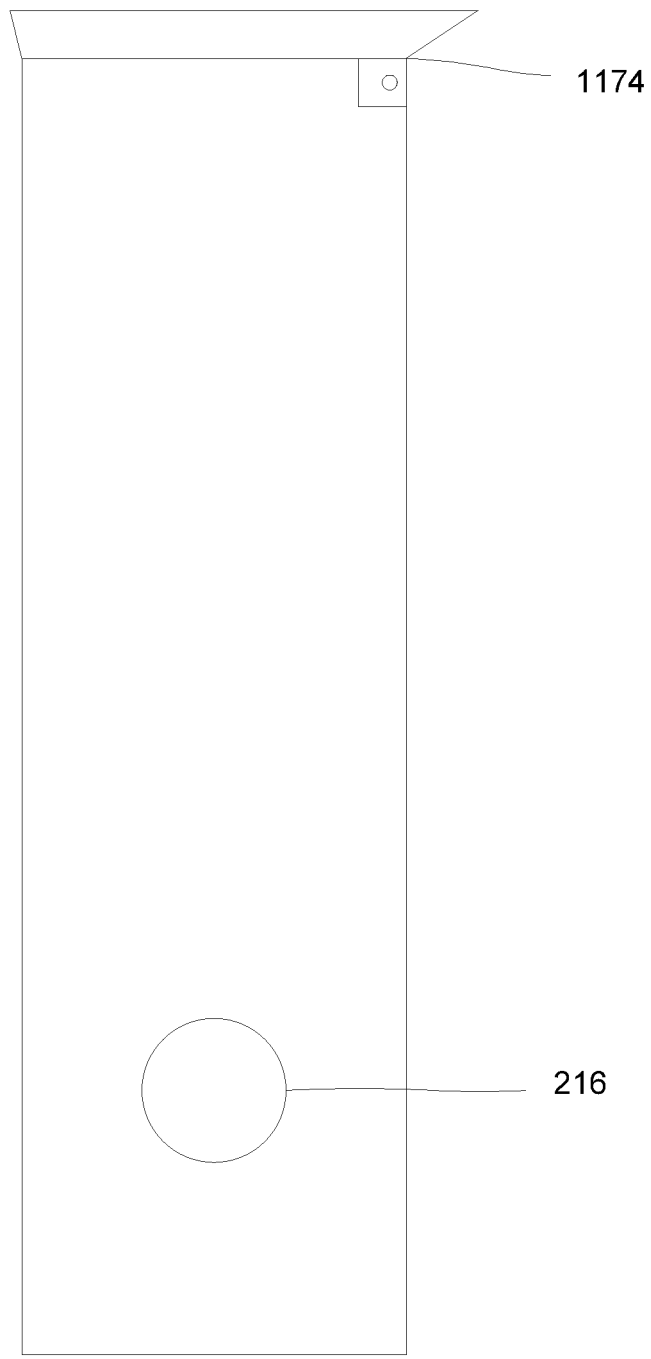
FIG. 11D is a side view of the same embodiment of FIGS. 11B and 11C, shown in its collapsible position.

FIG. 11D represents FIGS. 11A, 11B, and 11C as it is completely retracted and kept in place by a spring loaded hatch 1174. The projector 104 and every arm fold together to fit inside the adjustable mounting unit. This compacted unit can slide into the receiver hitch of a vehicle. To set up this invention, one must only open the hatch, slide out the telescopic arm, rotate the arm and the projector, and the unit will then be ready.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to display images on a vehicle, the apparatus comprising:
   connector arm comprising a first end insertable into a vehicle hitch receiver, and a second end;
   an intermediate arm pivotally coupled with the connector arm, via the second end of the connector arm, such that a first end of the intermediate arm is positionable vertically with reference to the vehicle hitch receiver;
   a projector mount pivotally coupled to a second end of the intermediate arm, the projector mount configured to receive a projector such that the projector is positionable at least one of vertically or horizontally with reference to the intermediate arm;
   wherein the projector is configured to project an image onto an outer surface of the vehicle; and
   an image cartridge removably insertable into a projector housing of the projector, the image cartridge positionable with reference to a lens to adjust a focus of the image on the vehicle.

2. The apparatus of claim 1, wherein the connector arm comprises at least one set of holes for receiving a hitch pin to secure the connector arm to the vehicle hitch receiver.

3. The apparatus of claim 2, wherein at least one of the connector arm, intermediate arm, and the projector mount extends outward telescopically.

4. The apparatus of claim 1, wherein the projector is a digital image projector which can be controlled, changed, or updated from inside the vehicle.

5. The apparatus of claim 1, wherein the projector further comprises at least one lens and at least one LED light source.

6. The apparatus of claim 1, further comprising a magnetic screen positionable on the vehicle to display the image.

7. The apparatus of claim 1, wherein the apparatus folds into itself compactly.

8. The apparatus of claim 1, wherein the adjustable mounting unit further comprises a compressed foam rubber collar configured to further secure the adjustable mounting unit to a trailer hitch receiver of the vehicle.

9. The apparatus of claim 1, wherein the unit is telescopic and retracts completely into the vehicle hitch receiver.

10. The apparatus of claim 1, wherein the projector further comprises an outer surface and a dial on the outer surface such that the dial on the outer surface causes the image cartridge to move with reference to the projector.

11. The apparatus of claim 1, wherein the apparatus comprises a light sensor which adapts the brightness of the projector to use for both day and night.

12. An apparatus to display images on a vehicle, the apparatus comprising:
   a connector arm comprising a first end insertable into a vehicle hitch receiver of a vehicle, and a second end;
   an intermediate arm pivotally coupled with the connector arm, via the second end of the connector arm, such that a first end of the intermediate arm is positionable vertically with reference to the vehicle hitch receiver;
   a projector mount pivotally coupled to a second end of the intermediate arm, the projector mount configured to receive a projector such that the projector is positionable at least one of vertically or horizontally with reference to the intermediate arm; and
   wherein the projector is configured to project an image onto an outer surface of the vehicle.

13. The apparatus of claim 12, further comprising an image cartridge removably insertable into a projector housing of the projector, the image cartridge positionable with reference to a lens to adjust a focus of the image on the vehicle.

14. A system to project an image onto the exterior surface of a vehicle, the system comprising:
   a connector arm comprising a first end insertable into a vehicle hitch receiver of a vehicle, and a second end;
   an intermediate arm pivotally coupled with the connector arm, via the second end of the connector arm, such that a first end of the intermediate arm is positionable vertically with reference to the vehicle hitch receiver;
   a projector mount pivotally coupled to a second end of the intermediate arm, the projector mount configured to receive a projector such that the projector is positionable at least one of vertically or horizontally with reference to the intermediate arm;
   wherein the projector is configured to project an image onto an outer surface of the vehicle; and
   a focusing mechanism on a rear surface of the projector that focuses the image on the vehicle.

15. A method for projecting an image onto an outer surface of an vehicle, the method comprising:
   providing a connector arm comprising a first end insertable into a vehicle hitch receiver of a vehicle, and a second end;
   providing an intermediate arm pivotally coupled with the connector arm, via the second end of the connector arm, such that the first end of the intermediate arm is positionable vertically with reference to the vehicle hitch receiver;
   providing a projector mount pivotally coupled to a second end of the intermediate arm, the projector mount configured to receive a projector such that the projector is positionable at least one of vertically or horizontally with reference to the intermediate arm;
   wherein the projector is configured to project an image onto an outer surface of the vehicle; and
   orienting the projector such that an image is projected onto the outer surface of the vehicle.

* * * * *